(12) United States Patent
Cho et al.

(10) Patent No.: US 7,633,533 B2
(45) Date of Patent: Dec. 15, 2009

(54) FLICKER FREQUENCY DETECTION METHOD AND RELATED DEVICE

(75) Inventors: Chia-Chuan Cho, Taoyuan County (TW); Hou-Chun Ting, Changhua County (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 570 days.

(21) Appl. No.: 11/466,107

(22) Filed: Aug. 22, 2006

(65) Prior Publication Data
US 2007/0263101 A1     Nov. 15, 2007

(30) Foreign Application Priority Data
May 10, 2006     (TW) ............................... 95116544 A

(51) Int. Cl.
*H04N 9/73* (2006.01)
(52) U.S. Cl. ................................. 348/226.1; 348/227.1
(58) Field of Classification Search ............. 348/226.1, 348/607, 227.1, 228.1, 229.1, 230.1
See application file for complete search history.

(56) References Cited

U.S. PATENT DOCUMENTS

| | | | |
|---|---|---|---|
| 6,710,818 B1 * | 3/2004 | Kasahara et al. ............ 348/607 |
| 7,164,439 B2 * | 1/2007 | Yoshida et al. ............ 348/226.1 |
| 7,248,289 B2 * | 7/2007 | Katoh et al. ............. 348/228.1 |
| 7,471,315 B2 * | 12/2008 | Silsby et al. ............. 348/226.1 |
| 2002/0158971 A1 * | 10/2002 | Daiku et al. ............. 348/226.1 |
| 2003/0090566 A1 | 5/2003 | Smith et al. |
| 2003/0112343 A1 * | 6/2003 | Katoh et al. ............. 348/226.1 |
| 2004/0012692 A1 | 1/2004 | Arazaki |
| 2004/0080630 A1 * | 4/2004 | Kim ....................... 348/226.1 |
| 2004/0201729 A1 | 10/2004 | Poplin et al. |

* cited by examiner

*Primary Examiner*—Lin Ye
*Assistant Examiner*—Ahmed A Berhan
(74) *Attorney, Agent, or Firm*—Winston Hsu

(57) ABSTRACT

A flicker frequency detection method includes defining a plurality of adjacent sensing sections of the same size on a display panel based on an M Hz frequency, an N Hz frequency and the panel resolution, calculating a reference average signal detected by a first sensing section, calculating a first average signal detected by an (n+1)th sensing section, calculating a second average signal detected by an (m+1)th sensing section, calculating a first difference value between the first and reference average signals, calculating a second difference value between the second and reference average signals, determining a relationship between the first and second difference values, and outputting corresponding signals based on the relationship between the first and second difference values. The ratio between the area covered by the first through mth sensing sections and that covered by the first through nth sensing sections is proportional to the ratio between M and N.

20 Claims, 8 Drawing Sheets

FLICKER FREQUENCY DETECTION METHOD AND RELATED DEVICE

BACKGROUND OF THE INVENTION

1. Field of the Invention

The present invention relates to methods and devices capable of detecting flicker frequency, and more particularly, to methods and devices capable of detecting flicker frequency caused by a discharge lamp when operating at different frequencies.

2. Description of the Prior Art

With the development of digital technologies, digital cameras become more and more common. A digital camera measures light intensities and transforms the measured optical signals into digital signals for displaying or storing corresponding image data. Normally, a digital camera includes a complementary metal-oxide semiconductor (CMOS) sensor and an electronic rolling shutter (ERS). The CMOS sensor usually includes CMOS devices arranged in a matrix manner, and the ERS can control the exposure time and the exposure frequency of the CMOS devices.

As digital cameras are positioned to replace traditional film-based cameras, they must be capable of operating under a variety of lighting situations. For example, digital cameras must be able to capture videos of scenes which are illuminated by sunlight, if outdoors, or which are illuminated by discharge lamps (such as incandescent or fluorescent lights), if indoors. A discharge lamp is usually driven by an AC (alternative current) source of 50 Hz or 60 Hz frequencies and provides light intensities that vary periodically with time based on different frequencies. During image pick-up of a frame, the ERS only exposes several scan lines of the frame instead of exposing all scan lines simultaneously. Therefore, when the light intensity provided by a light source varies periodically with time, interleaving dark and bright stripes, known as image flicker, can be observed in the frame captured by the ERS-controlled CMOS sensor. For example, when a user wants to take photos indoors using a digital camera, the screen of the digital camera is often used for previewing the effect of shot-selection. If the indoor lighting varies periodically with time, image flicker will be observed in the preview images displayed on the screen of the digital camera and thus influences the judgment of the user. This can cause inconvenience to the user.

Reference is made to FIG. 1 for a diagram illustrating image flicker and variations in the light intensity when a discharge lamp operates at 60 Hz frequency. On the left side of FIG. 1, a frame image illustrates image flicker caused by the discharge lamp operating at 60 Hz frequency. On the right side of FIG. 1, a signal diagram illustrates the variations in the light intensity when the discharge lamp operates at 60 Hz frequency. Curve M depicts how the light intensity varies with the scan lines (or the exposure time of the scan lines) when the discharge lamp is driven by a 60 Hz AC source. When Curve M has minimum values, images picked up by corresponding scan lines have lower brightness; when Curve M has maximum values, images picked up by corresponding scan lines have higher brightness. Therefore, horizontal-striped flicker bands can be observed in the frame image. Two adjacent scan lines providing the same light intensity during image pick-up correspond to an interval on Curve M, which is referred to flicker period. When operating at 60 Hz frequency, the flicker frequency $H_{f60}$ of the discharge lamp is 120 Hz and the corresponding flicker period is represented by $T_{f60}$ in FIG. 1. Under these circumstances, striped flicker bands of width $L_{f60}$ can be observed in the frame image.

Reference is made to FIG. 2 for a diagram illustrating image flicker and variations in the light intensity when a discharge lamp operates at 50 Hz frequency. On the left side of FIG. 2, a frame image illustrates image flicker caused by the discharge lamp operating at 50 Hz frequency. On the right side of FIG. 2, a signal diagram illustrates the variations in the light intensity when the discharge lamp operates at 50 Hz frequency. Curve N depicts how the light intensity varies with the scan lines (or the exposure time of the scan lines) when the discharge lamp is driven by a 50 Hz AC source. When Curve N has minimum values, images picked up by corresponding scan lines have lower brightness; when Curve N has maximum values, images picked up by corresponding scan lines have higher brightness. Therefore, horizontal-striped flicker bands can be observed in the frame image. Two adjacent scan lines providing the same light intensity during image pick-up correspond to an interval on Curve N, which is referred to flicker period. When operating at 50 Hz frequency, the flicker frequency $H_{f50}$ of the discharge lamp is 100 Hz and the corresponding flicker period is represented by $T_{f50}$ in FIG. 2. Under these circumstances, striped flicker bands of width $L_{f50}$ can be observed in the frame image.

In order to avoid image flicker, the exposure time controlled by the ERS is normally set to an integral multiple of the flicker period so that the average light intensity detected during the exposure time is constant. For instance, the exposure time of the ERS can be set to an integral multiple of 8.33 ms and an integral multiple of 10 ms for a discharge lamp operating at 60 Hz and 50 Hz, respectively. However, different frequencies are adopted in different countries for driving discharge lamps. Therefore, to avoid image flickering, it is crucial to correctly detect the operating frequency of a discharge lamp for setting the exposure time of the ERS to a corresponding value.

Reference is made to FIG. 3 for a diagram illustrating a temporal method disclosed in U.S. Patent Publication 2003/0112343 for detecting the operating frequency of a discharge lamp causing image flicker (hereafter referred to flicker frequency). In the prior art method depicted in FIG. 3, the frame of a display panel is divided into a plurality of flicker-detecting frames SUB1-SUBn. By calculating signals measured by each flicker-detecting frame, brightness variations can be obtained for acquiring the flicker frequency. The disadvantage of this prior art is that functions such as auto-exposure and auto white balance have to be terminated while detecting the flicker frequency.

In U.S. Patent Publication 2003/0090566, another temporal method for detecting the flicker frequency of a discharge lamp is disclosed. The exposure time of the CMOS sensor is set to a multiple of 100 Hz and 120 Hz, respectively. After formatting and performing Fast Fourier Transform (FFT) on optical signals measured under these exposure times, the flicker frequency can thus be obtained.

Also, in U.S. Patent Publications 2004/0201729 and 2004/0012692, spatial methods for detecting the flicker frequency of a discharge lamp are disclosed. After measuring a signal waveform of a scan line in a frame, Discrete Fourier Transform (DFT) or FFT is performed for determining whether the maximum value of the signal corresponds to flicker frequency 110 Hz or 120 Hz. The spatial methods for detecting the flicker frequency require complicate systems for performing DFT or FFT.

SUMMARY OF THE INVENTION

The present invention provides a method for detecting flicker frequency comprising (a) defining a sensing window including a plurality of adjacent sensing sections of a same size on a display panel based on a panel resolution and an M Hz frequency and an N Hz frequency of a light source; (b) calculating a reference average signal detected by a first sensing section of the sensing window; (c) calculating a first average signal detected by an (n+1)th sensing section of the sensing window; (d) calculating a second average signal detected by an (m+1)th sensing section of the sensing window, wherein a ratio between an area covered by the first through mth sensing sections and an area covered by the first through nth sensing sections is proportional to a ratio between M and N; (e) calculating a first difference value corresponding to a difference between the first and reference average signals; (f) calculating a second difference value corresponding to a difference between the second and reference average signals; (g) determining a relationship between the first and second difference values; and (h) outputting corresponding signals based on the relationship between the first and second difference values.

The present invention also provides a method for determining an operating frequency of a light source, the operating frequency of the light source including either an M Hz frequency or an N Hz frequency, the method comprising (a) defining a sensing window including a plurality of adjacent sensing sections of a same size on a display panel; (b) calculating a reference average signal detected by a first sensing section of the sensing window; (c) calculating a first average signal detected by an (n+1)th sensing section of the sensing window; (d) calculating a second average signal detected by an (m+1)th sensing section of the sensing window, wherein a ratio between an area covered by the first through mth sensing sections and an area covered by the first through nth sensing sections is proportional to a ratio between M and N; (e) calculating a first difference value corresponding to a difference between the first and reference average signals; (f) calculating a second difference value corresponding to a difference between the second and reference average signals; (g) determining a relationship between the first and second difference values; and (h) determining the operating frequency of the light source based on the relationship between the first and second difference values.

The present invention also provides display device capable of detecting flicker frequency comprising an image-capturing device for capturing image under an illumination of a light source including an image sensor; and a shutter for controlling an exposure time of the image sensor; a display panel for displaying images; a sensing window including a plurality of adjacent sensing sections of a same size on a display panel; a judging device for outputting signals based on light intensities detected by a first, an (m+1)th, and an (n+1)th sensing sections of the sensing window, wherein a ratio between an area covered by the first through mth sensing sections and an area covered by the first through nth sensing sections is proportional to a ratio between M and N; and a control device coupled to the image-capturing device for controlling the shutter based on the signals outputted by the judging device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
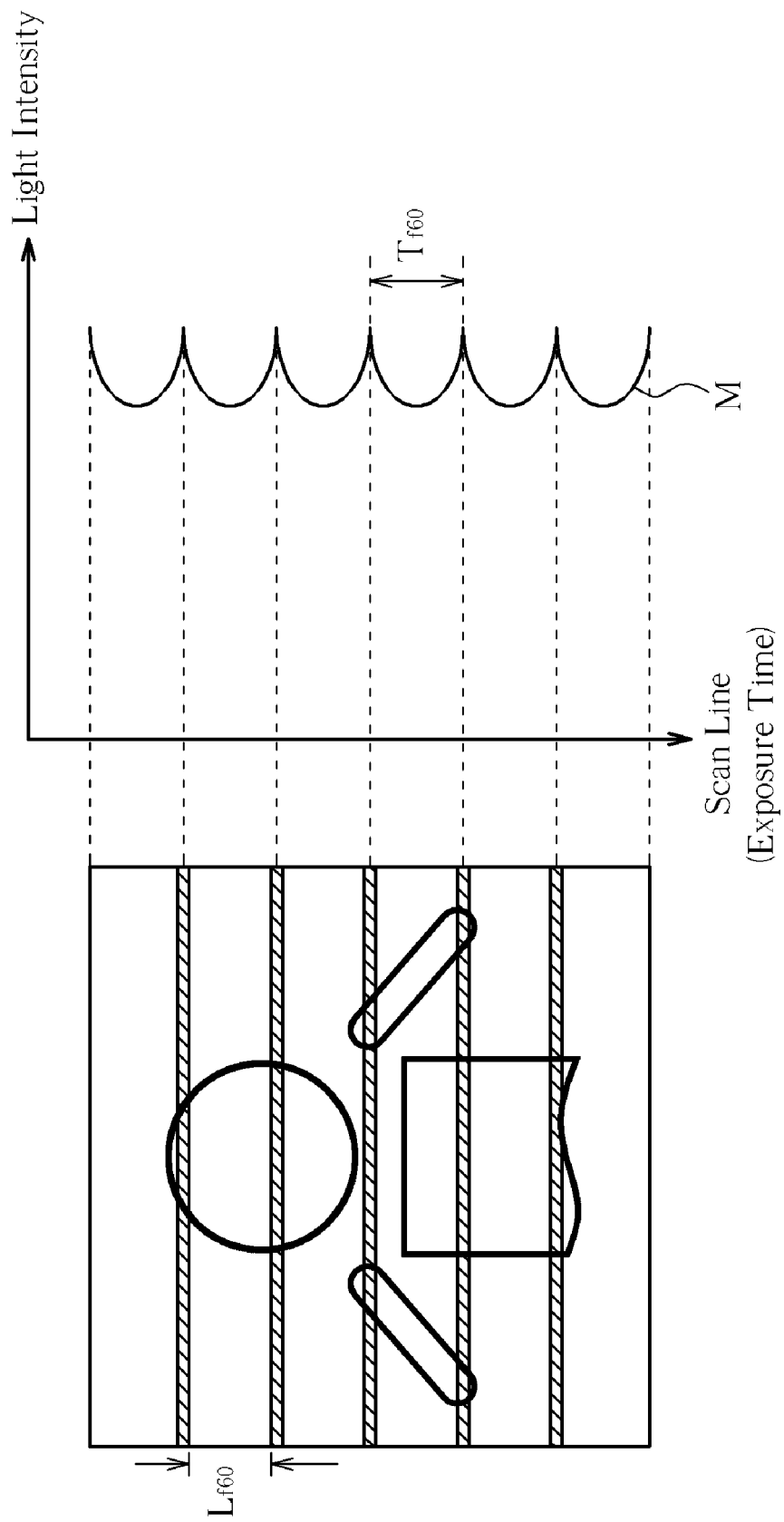
FIG. 1 is a diagram illustrating image flicker and variations in the light intensity when a discharge lamp operates at 60 Hz frequency.
Figure 2:
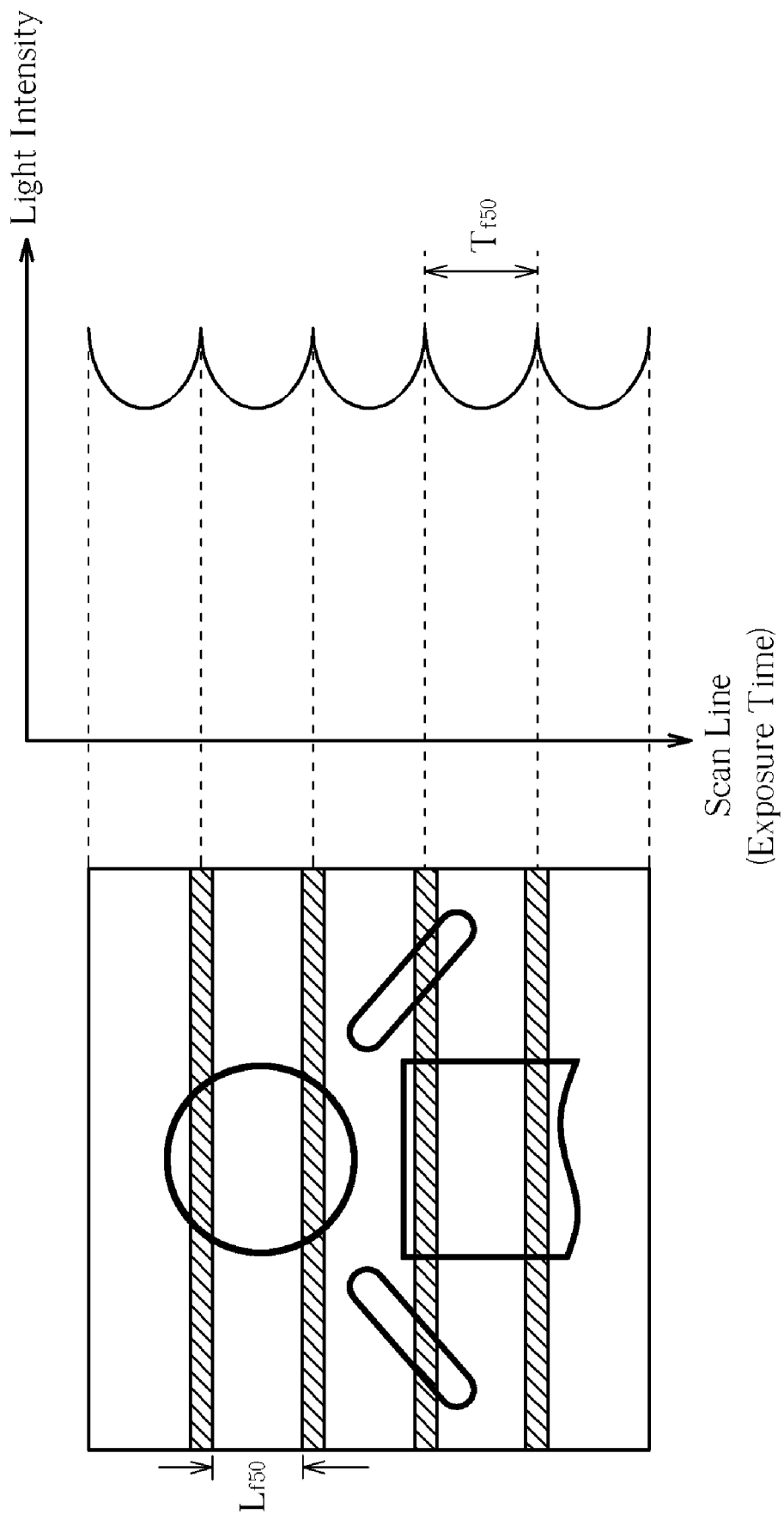
FIG. 2 is a diagram illustrating image flicker and variations in the light intensity when a discharge lamp operates at 50 Hz frequency.
Figure 3:
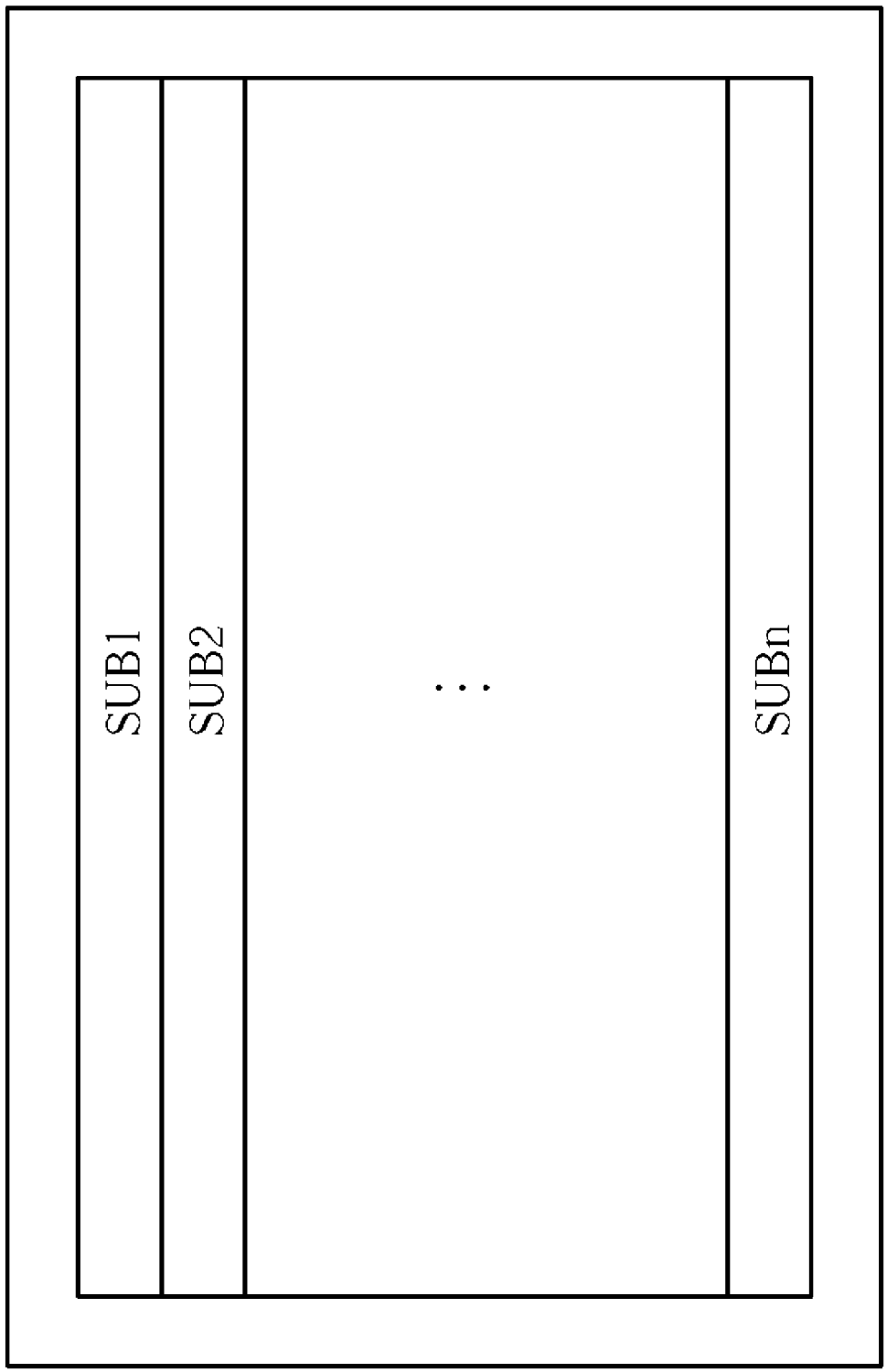
FIG. 3 is a diagram illustrating a prior art temporal method for detecting the flicker frequency.
Figure 4:
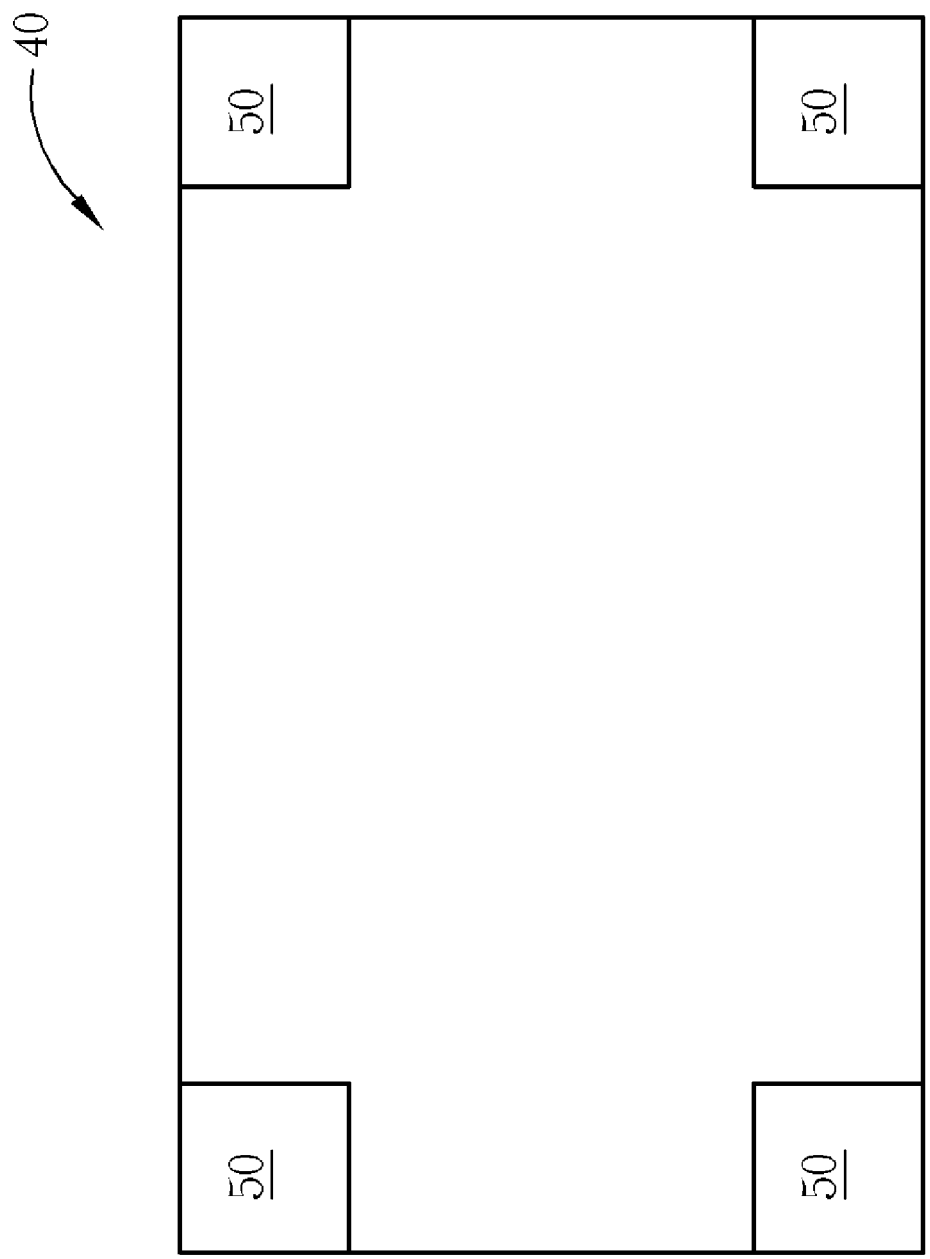
FIG. 4 is a diagram illustrating a display device capable of detecting flicker frequency according to the present invention.

Reference is made to FIG. 4 for a diagram illustrating a display device 40 capable of detecting flicker frequency according to the present invention. In FIG. 4, sensing windows 50 are disposed on four screen corners of the display device 40. Based on signals detected by the sensing windows 50, a differential signal Diff for each sensing window 50 can be calculated and represented by the following formula:

$$\text{Diff}=(\text{MAX}_R-\text{MIN}_R)+(\text{MAX}_G-\text{MIN}_G)+(\text{MAX}_B-\text{MIN}_B)$$

$\text{MAX}_R$ and $\text{MIN}_R$ respectively represent the maximum and the minimum values of the signal measured by the red channel of the display device 40, $\text{MAX}_G$ and $\text{MIN}_G$ respectively represent the maximum and the minimum values of the signal measured by the green channel of the display device 40, and $\text{MAX}_B$ and $\text{MIN}_B$ respectively represent the maximum and the minimum values of the signal measured by the red channel of the display device 40. A smaller differential signal Diff indicates smaller signal variations between signals measured by each channel. Therefore in the embodiment of FIG. 4, four sensing windows 50 are disposed on the four screen corners of the display device 40, and the flicker frequency is detected based on the signals measured by the sensing window having the smallest differential signal Diff. However, other numbers of sensing windows 50 can also be disposed on other locations of the display device 40, and the flicker frequency can be detected based on the signals measured by the sensing window having the smallest differential signal Diff. Or, if the hardware of the display device 40 provides sufficient computing abilities, a full-screen sensing window can be used for measuring signals and detecting the flicker frequency.

Figure 5:
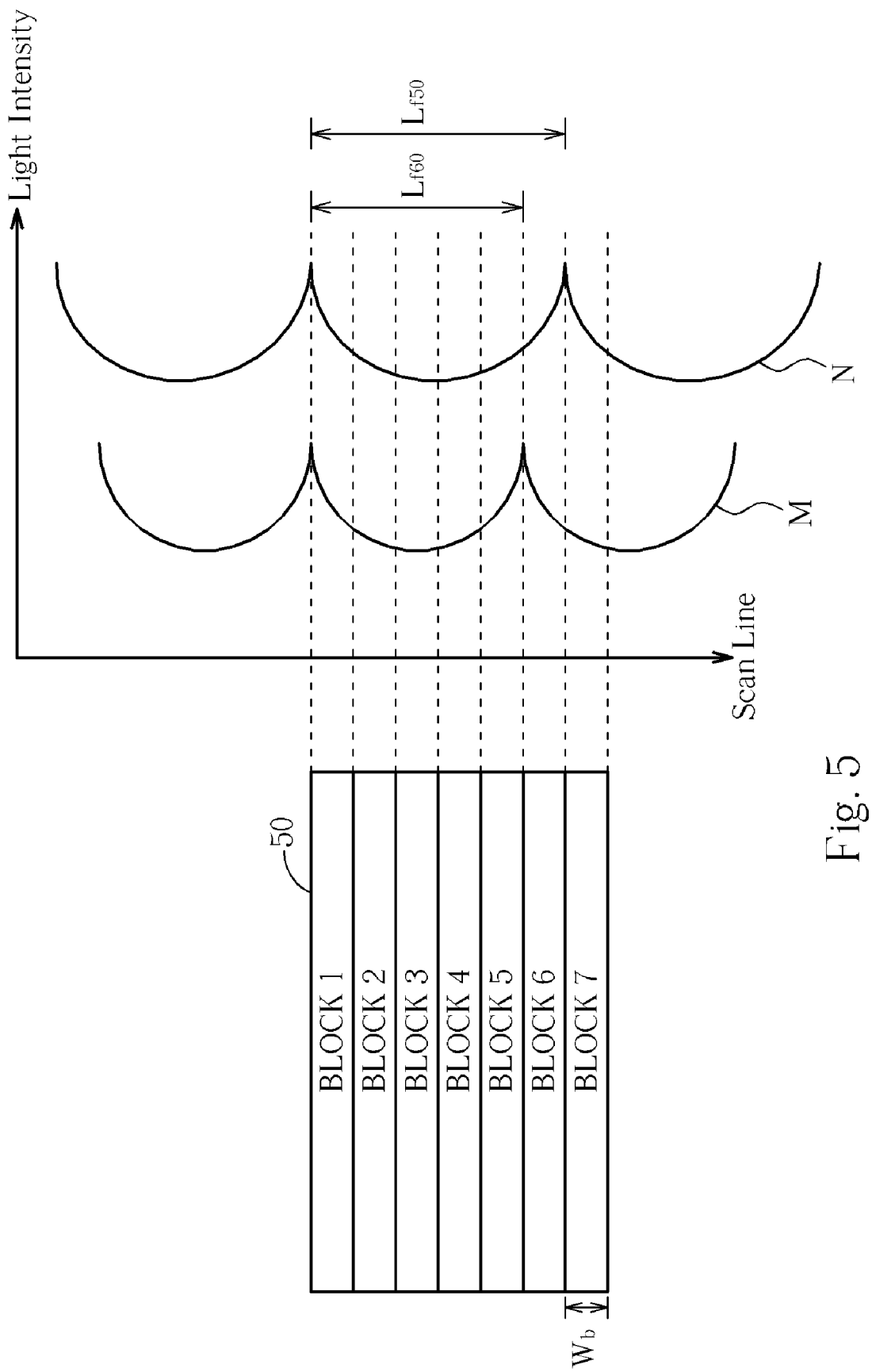
FIG. 5 is a diagram illustrating a sensing window and variations in the light intensity detected by the sensing window.

Reference is made to FIG. 5 for a diagram illustrating a sensing window 50 and variations in the light intensity detected by the sensing window 50. The sensing window 50 can include a plurality of adjacent sensing sections of the same size. In the embodiment shown on the left side of FIG. 5, the sensing window 50 includes sensing sections BLOCK1-BLOCK7, whose width is represented by $W_b$. The method for determining the value of $W_b$ will be described in the following paragraphs. On the right side of FIG. 5, Curve M represents the variations in the light intensity when a 60 Hz discharge lamp results in a flicker frequency of 120 Hz, while Curve N represents the variations in the light intensity when a 50 Hz discharge lamp results in a flicker frequency of 100 Hz. The sensing sections BLOCK1-BLOCK5 of the sensing window 50 can detect the variations in the light intensity provided by the 60 Hz discharge lamp within a period, and the sensing sections BLOCK1-BLOCK6 of the sensing window 50 can detect the variations in the light intensity provided by the 50 Hz discharge lamp within a period.

In the display device 40, the number of scan lines in the sensor, the frame rate, the operating frequency of the discharge lamp, the flicker frequency, the flicker number and the flicker band width are respectively represented by VSYNC, F, H, $H_f$, $N_f$, and $L_f$. The number of scan lines VSYNC is a ratio between the exposure time of a frame and that of a scan line. The frame rate F, whose unit is fps (frame per second), is the number of frames displayed per second. The operating frequency H of the discharge lamp is determined by the driving frequency of its AC source and can be 50 Hz or 60 Hz. The flicker frequency $H_f$, whose unit is also Hz, is twice as large as the value of the operating frequency H. The flicker number $N_f$ is the number of bright and dark stripes observed in a frame and equal to $H_f/F$. The flicker band width $L_f$, whose unit is pixel, is the width of the bright and dark stripes observed in a frame and equal to VSYNC/$N_f$.

For example, if the number of scan lines VSYNC in the sensor is 1232 and the frame frequency is 10 fps, $N_{f60}$ and $L_{f60}$ respectively represent the flicker number and the flicker band width caused by a discharge lamp having an operating frequency H of 60 Hz; and $N_{f50}$ and $L_{f50}$ respectively represent the flicker number and the flicker band width caused by a discharge lamp having an operating frequency H of 50 Hz. The values of $N_{f60}$, $L_{f60}$, $N_{f50}$, and $L_{f50}$ can be represented by the following formulae:

$$N_{f60} = H_{f60}/F = 2*60/10 = 12;$$

$$N_{f50} = H_{f50}/F = 2*50/10 = 10;$$

$$L_{f60} = VSYNC/N_{f60} = 1232/12 \approx 102.67;$$

$$L_{f50} = VSYNC/N_{f50} = 1232/10 = 123.2$$

When the discharge lamp operates at 60 Hz and 50 Hz, the resultant flicker band width $L_{f60}$ and $L_{f50}$ on the frame are roughly 102.67 and 123.2 pixels, respectively. Since the lowest common multiple of the flicker numbers $N_{f60}$ and $N_{f50}$ is 60, the width of each sensing section can be set to $W_b$ pixels. The value of $W_b$ can be represented by the following formula:

$$W_b = VSYNC/[N_{f50}, N_{f50}] = 1232/60 \approx 20.533$$

Therefore, when the discharge lamp operates at 60 Hz and 50 Hz, the resultant flicker band width $L_{f60}$ and $L_{f50}$ on the frame each includes ($N_{f60}/W_b$) and ($N_{f50}/W_b$) sensing sections, which are respective represented as follows:

$$N_{f60}/W_b = (VSYNC/N_{f60})/(VSYNC/[N_{f60}, N_{f50}]) = [N_{f60}, N_{f50}]/N_{f60} = 5;$$

$$N_{f50}/W_b = (VSYNC/N_{f50})/(VSYNC/[N_{f60}, N_{f50}]) = [N_{f60}, N_{f50}]/N_{f60} = 6$$

Thus, when the width of each sensing section is set to $W_b$ pixels, the complete variations in the light intensity provided by the 60 Hz discharge lamp within a period can be measured by five adjacent sensing sections (the sensing sections BLOCK1-BLOCK5) of the sensing window 50, and the complete variations in the light intensity provided by the 50 Hz discharge lamp within a period can be measured by six adjacent sensing sections (the sensing sections BLOCK1-BLOCK6) of the sensing window 50.

Figure 6:
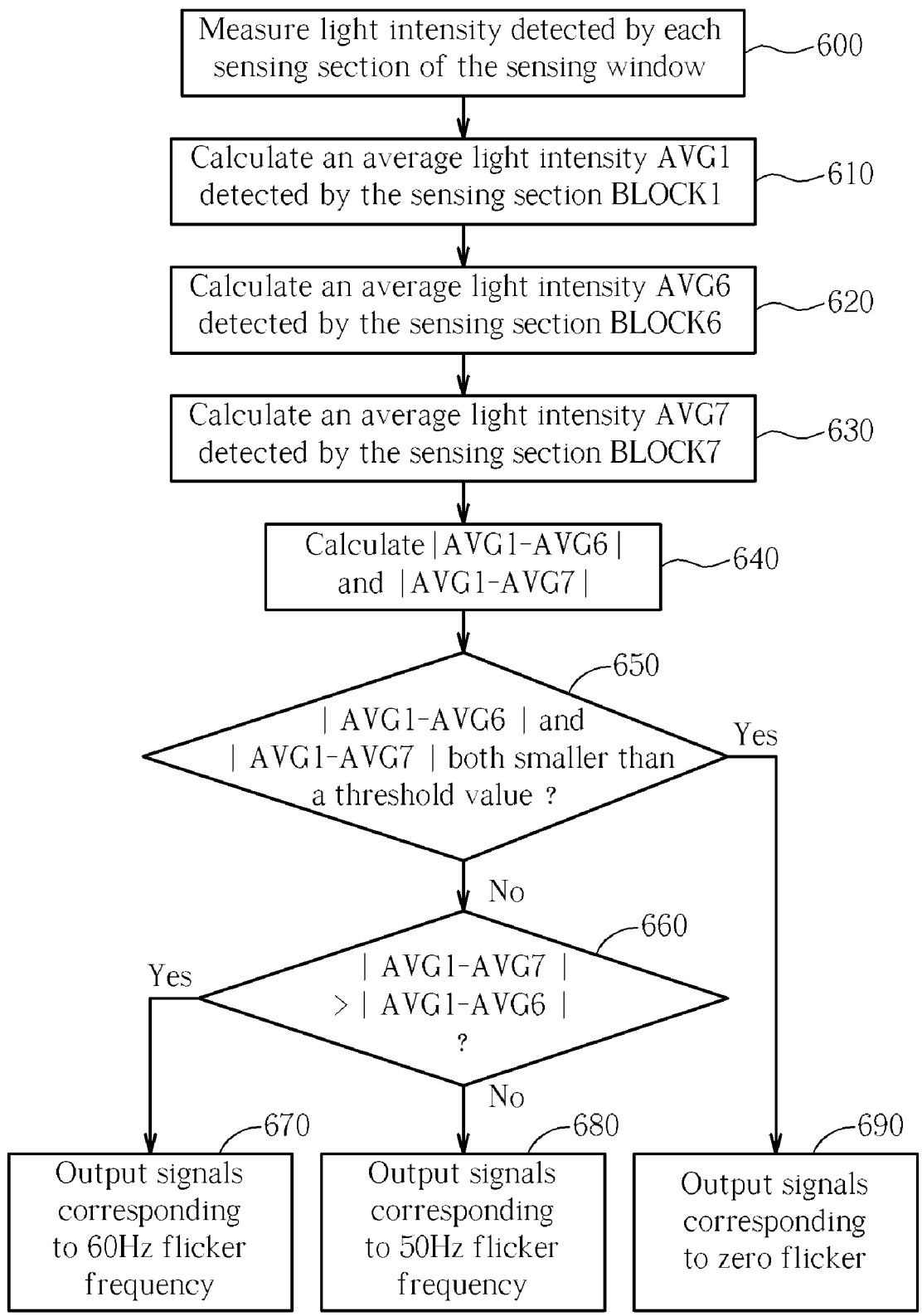
FIG. 6 is a flowchart illustrating a method for detecting flicker frequency according to the present invention.

Reference is made to FIG. 6 for a flowchart illustrating a method for detecting flicker frequency according to the present invention. The flowchart in FIG. 6 includes the following steps:

Step 600: measure light intensity detected by each sensing section of the sensing window 50.

Step 610: calculate an average light intensity AVG1 detected by the sensing section BLOCK1 of the sensing window 50.

Step 620: calculate an average light intensity AVG6 detected by the sensing section BLOCK6 of the sensing window 50.

Step 630: calculate an average light intensity AVG7 detected by the sensing section BLOCK7 of the sensing window 50.

Step 640: calculate an absolute difference $ABS_{f50}$ between the average light intensities AVG1 and AVG6, and calculate an absolute difference $ABS_{f60}$ between the average light intensities AVG1 and AVG7.

Step 650: determine whether the absolute differences $ABS_{f50}$ and $ABS_{f60}$ are both smaller than a threshold value; if the absolute differences $ABS_{f50}$ and $ABS_{f60}$ are both smaller than the threshold value, execute step 690; if the absolute differences $ABS_{f50}$ and $ABS_{f60}$ are not both smaller than the threshold value, execute step 660.

Step 660: determine whether the absolute difference $ABS_{f60}$ is larger then the absolute difference $ABS_{f50}$; if the absolute difference $ABS_{f60}$ is larger then the absolute difference $ABS_{f50}$, execute step 670; if the absolute difference $ABS_{f60}$ is smaller then the absolute difference $ABS_{f50}$, execute step 680.

Step 670: output signals corresponding to 60 Hz flicker frequency.

Step 680: output signals corresponding to 50 Hz flicker frequency.

Step 690: output signals corresponding to zero flicker.

The average light intensity AVG1 detected by the sensing section BLOCK1 obtained in step 610 can be viewed as a reference signal. With different operating frequencies, the difference between the average light intensity AVG1 and the average light intensity detected by other sensing sections also vary accordingly. As mentioned before, when the width of each sensing section is set to $W_b$ pixels, the flicker band width $L_{f60}$ due to an 60 Hz discharge lamp and the flicker band width $L_{f50}$ due to an 50 Hz discharge lamp include 5 and 6 sensing sections, respectively. In other words, using the sensing section BLOCK1 as a basis, the complete variations in the light intensity provided by the 60 Hz discharge lamp within a period can be detected by the sensing sections BLOCK1-BLOCK5, while the complete variations in the light intensity provided by the 50 Hz discharge lamp within a period can be detected by the sensing sections BLOCK1-BLOCK6. Therefore, when the discharge lamp operates at 60 Hz frequency, the average light intensities detected by the sensing section BLOCK1 and BLOCK6 will be the same or approximate to each other closely. Similarly, when the discharge lamp operates at 50 Hz frequency, the average light intensities detected by the sensing section BLOCK1 and BLOCK7 will be the same or approximate to each other closely.

For ease of explanation, assuming the average light intensity AVG1 detected by the sensing block BLOCK1 corresponds to the minimum light intensity provided by the discharge lamp, as illustrated in FIG. 5. If the discharge lamp operates at 60 Hz frequency, the average light intensity AVG7 detected by the sensing section BLOCK7 obtained in step 630 will be larger then the average light intensity AVG6 detected by the sensing section BLOCK6 obtained in step 620. Consequently, the absolute difference $ABS_{f60}$ will be larger then the absolute differences $ABS_{f50}$, and signals corresponding to a 60 Hz flicker frequency will be outputted in step 670. Similarly, if the discharge lamp operates at 50 Hz frequency, the average light intensity AVG7 detected by the sensing section BLOCK7 obtained in step 630 will be smaller then the average light intensity AVG6 detected by the sensing section BLOCK6 obtained in step 620. Consequently, the absolute difference $ABS_{f60}$ will be smaller then the absolute differences $ABS_{f50}$, and signals corresponding to a 50 Hz flicker frequency will be outputted in step 670. Also, it is determined in step 650 whether the absolute differences $ABS_{f50}$ and $ABS_{f60}$ are both smaller than a threshold value. If the absolute differences $ABS_{f50}$ and $ABS_{f60}$ are both smaller than the threshold value, the variations in the light intensity are negligible and signals corresponding to zero flicker will be outputted in step 690.

Figure 7:
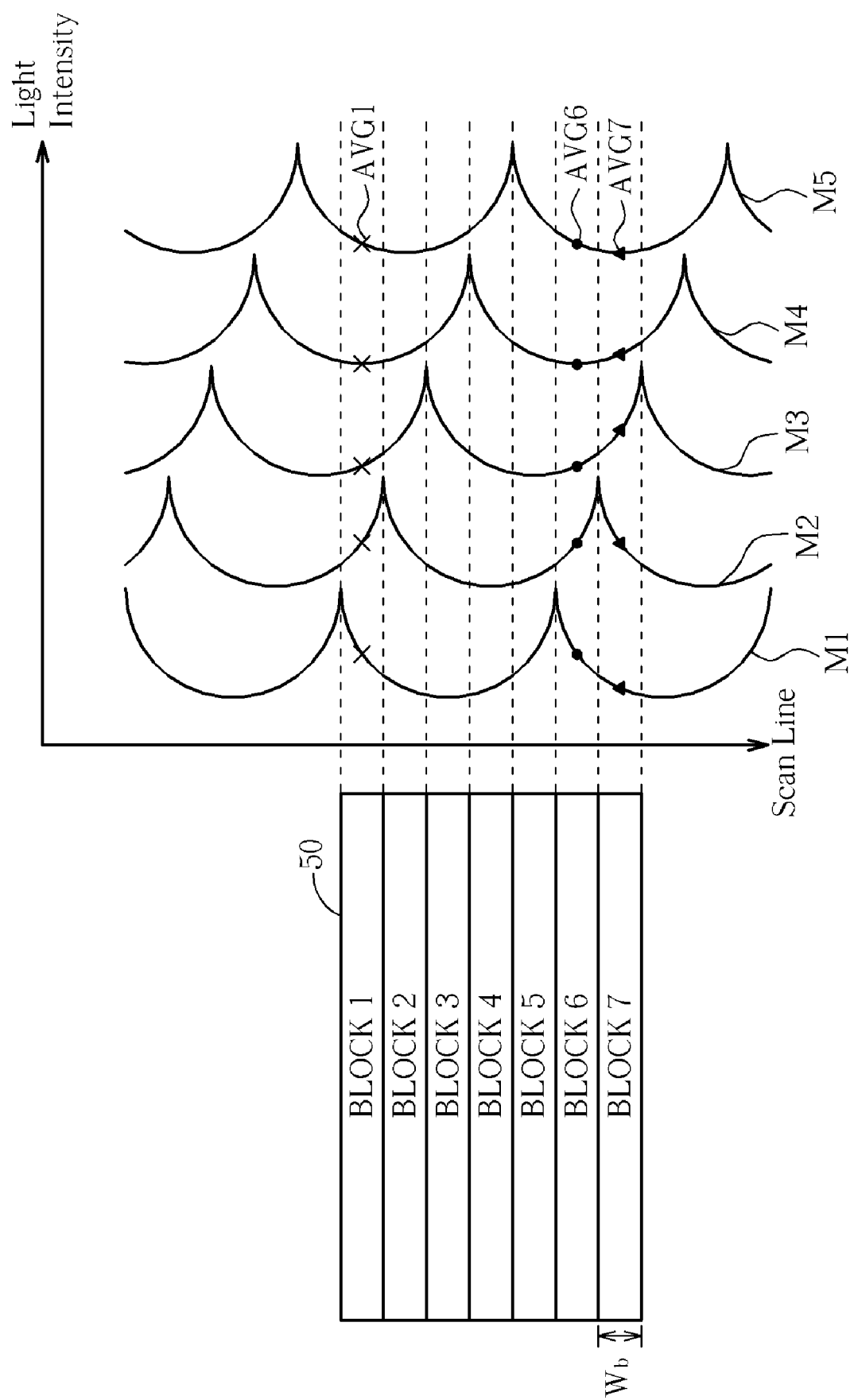
FIG. 7 is a diagram illustrating the relationship between the location of the sensing window and variations in the light intensity provided by a 60 Hz discharge lamp.

Reference is made to FIG. 7 for a diagram illustrating the relationship between the location of the sensing window 50 and the variations in the light intensity provided by a 60 Hz discharge lamp. When the sensing window is disposed on different locations, the light intensities of the 60 Hz discharge lamp detected by the sensing window 50 also vary accordingly, as represented by Curves M1-M5. In FIG. 7, the average light intensities AVG1, AVG6 and AVG7 are respectively marked by "X", "●" and "▲" on Curves M1-M5. As shown in FIG. 7, even if the average light intensity AVG1 does not correspond to the minimum light intensity of the 60 Hz discharge lamp as represented by Curve M1, the complete variations in the light intensity provided by the 60 Hz discharge lamp within a period can still be measured by the sensing sections BLOCK1-BLOCK5. The average light intensities detected by the sensing section BLOCK1 and BLOCK6 will be the same or approximate to each other closely, while the average light intensities detected by the sensing section BLOCK1 and BLOCK7 will be substantially different. Therefore, regardless of the location of the sensing window 50, the present invention can correctly detect the flicker frequency of the discharge lamp and set the exposure time of the ERS to the corresponding value in order to avoid image flicker.

Figure 8:
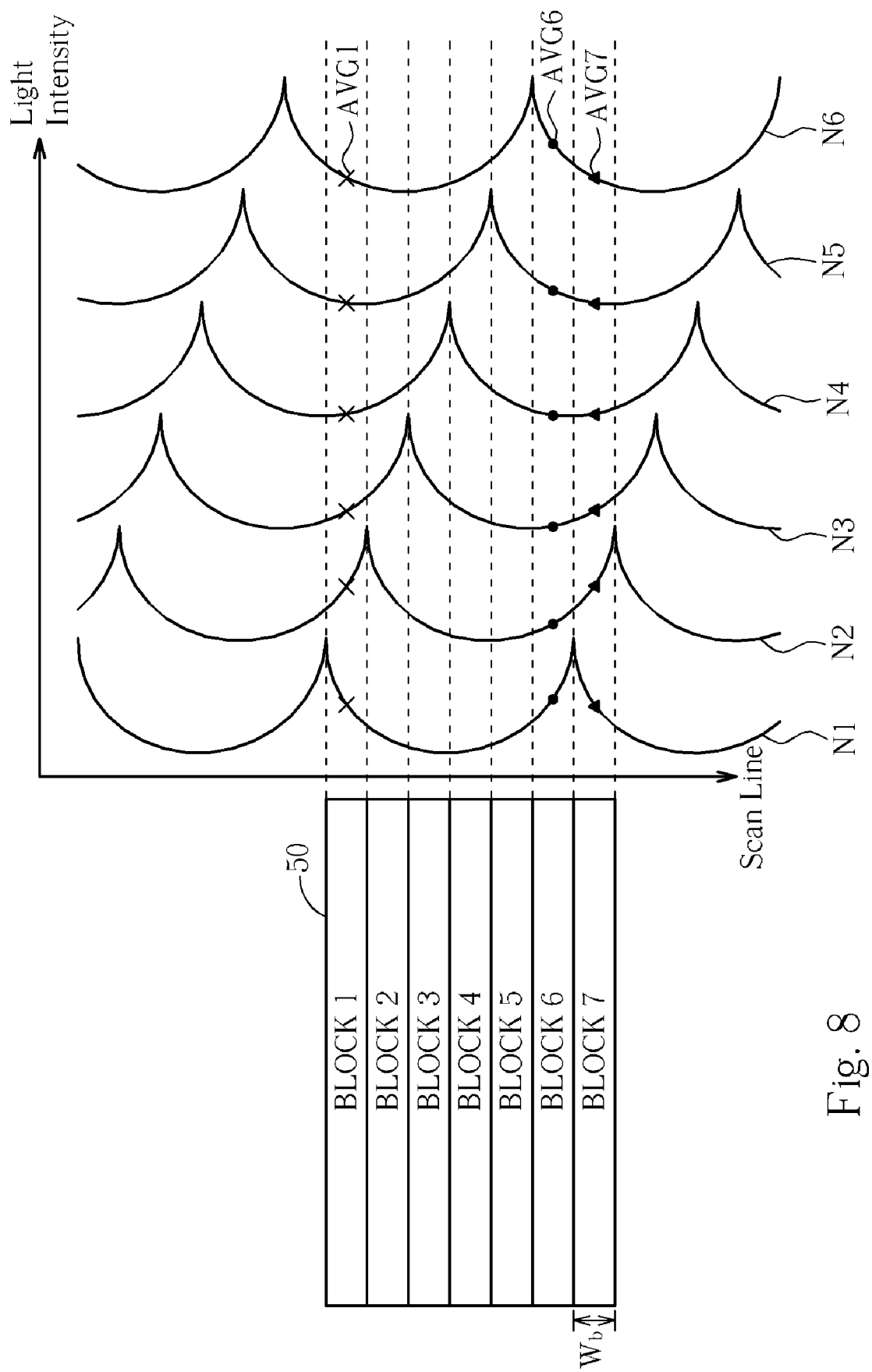
FIG. 8 is a diagram illustrating the relationship between the location of the sensing window and variations in the light intensity provided by a 50 Hz discharge lamp.

Reference is made to FIG. 8 for a diagram illustrating the relationship between the location of the sensing window 50 and the variations in the light intensity provided by a 50 Hz discharge lamp. When the sensing window is disposed on different locations, the light intensities of the 50 Hz discharge lamp detected by the sensing window 50 also vary accordingly, as represented by Curves N1-N5. In FIG. 8, the average light intensities AVG1, AVG6 and AVG7 are respectively marked by "X", "●" and "▲" on Curves N1-N5. As shown in FIG. 8, even if the average light intensity AVG1 does not correspond to the minimum light intensity of the 50 Hz discharge lamp as represented by Curve N1, the complete variations in the light intensity provided by the 50 Hz discharge lamp within a period can still be measured by the sensing sections BLOCK1-BLOCK6. The average light intensities detected by the sensing section BLOCK1 and BLOCK7 will be the same or approximate to each other closely, while the average light intensities detected by the sensing section BLOCK1 and BLOCK6 will be substantially different. Therefore, regardless of the location of the sensing window 50, the present invention can correctly detect the flicker frequency of the discharge lamp and set the exposure time of the ERS to the corresponding value in order to avoid image flicker.

In the above-mentioned embodiments of the present invention, the sensing window 50 includes 7 adjacent sensing sections BLOCK1-BLOCK7 having the same width $W_b$. Based on the average light intensities detected by the sensing sections BLOCK1, BLOCK6 and BLOCK7, the flicker frequency can be determined. However, the sensing window 50 illustrated in the above-mentioned embodiments does not limit the scope of the present invention. In the present invention, each sensing section of the sensing window 50 can have a width equal to a multiple of $W_b$ pixels. The periodic variations in the light intensity causing image flicker can also be detected based the average light intensities detected by the sensing sections BLOCK1, BLOCK6 and BLOCK7. Or, the sensing window 50 can include another number of adjacent sensing sections having the same width. Using the average light intensity detected by a sensing section BLOCKm as a basis, the average light intensities detected by a sensing section BLOCK(m+5n) and a sensing section BLOCK(m+6n) can be obtained for determining the flicker frequency.

The present invention provides a method for detecting flicker frequency. A sensing window including a plurality of adjacent sensing sections of the same size is disposed on the display panel for detecting periodic variations in the light intensities provided by a discharge lamp operating at different frequencies, and thereby determining the flicker frequency of the discharge lamp.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for a display device to detect flicker frequency comprising the following steps:
   (a) defining a sensing window including a plurality of adjacent sensing sections of a same size on a display panel of the display device based on resolution of the display panel and an M Hz frequency and an N Hz frequency of a light source;
   (b) calculating a reference average signal detected by a first sensing section of the sensing window;
   (c) calculating a first average signal detected by an (n+1)th sensing section of the sensing window;
   (d) calculating a second average signal detected by an (m+1)th sensing section of the sensing window, wherein a ratio between an area covered by the first through mth sensing sections and an area covered by the first through nth sensing sections is proportional to a ratio between M and N;
   (e) calculating a first difference value corresponding to a difference between the first and reference average signals;
   (f) calculating a second difference value corresponding to a difference between the second and reference average signals;
   (g) determining a relationship between the first and second difference values; and
   (h) outputting corresponding signals based on the relationship between the first and second difference values.

2. The method of claim 1 further comprising:
   determining if the first and second difference values are both larger than a predetermined value.

3. The method of claim 2 wherein step (h) comprises:
   outputting an operating signal corresponding to zero flicker when the first and second difference values are both smaller than the predetermined value.

4. The method of claim 2 wherein step (h) comprises:
   outputting an operating signal corresponding to the M Hz flicker frequency when the first and second difference values are both larger than the predetermined value and the second difference value is larger than the first difference value.

5. The method of claim 2 wherein step (h) comprises:
outputting an operating signal corresponding to the N Hz flicker frequency when the first and second difference values are both larger than the predetermined value and the first difference value is larger than the second difference value.

6. The method of claim 1 further comprising:
calculating a first flicker number observed on the display panel when the light source operates at the M Hz frequency; and
calculating a second flicker number observed on the display panel when the light source operates at the N Hz frequency.

7. The method of claim 6 further comprising:
calculating a first flicker band width observed on the display panel when the light source operates at the M Hz frequency based on the first flicker number and the panel resolution; and
calculating a second flicker band width observed on the display panel when the light source operates at the N Hz frequency based on the second flicker number and the panel resolution.

8. The method of claim 7 further comprising:
determining an area of each sensing section based on the first and second flicker band widths.

9. The method of claim 1 wherein M and N are equal to 60 and 50, respectively.

10. The method of claim 1 wherein M and N are equal to 50 and 60, respectively.

11. A method for a display device to determine an operating frequency of a light source, the operating frequency of the light source including either an M Hz frequency or an N Hz frequency, the method comprising the following steps:
(a) defining a sensing window including a plurality of adjacent sensing sections of a same size on a display panel of the display device;
(b) calculating a reference average signal detected by a first sensing section of the sensing window;
(c) calculating a first average signal detected by an (n+1)th sensing section of the sensing window;
(d) calculating a second average signal detected by an (m+1)th sensing section of the sensing window, wherein a ratio between an area covered by the first through mth sensing sections and an area covered by the first through nth sensing sections is proportional to a ratio between M and N;
(e) calculating a first difference value corresponding to a difference between the first and reference average signals;
(f) calculating a second difference value corresponding to a difference between the second and reference average signals;
(g) determining a relationship between the first and second difference values; and (h) determining the operating frequency of the light source based on the relationship between the first and second difference values.

12. The method of claim 11 wherein step (h) comprises determining that the operating frequency of the light source is the M Hz frequency when the second difference value is larger than the first difference value.

13. The method of claim 11 wherein step (h) comprises determining that the operating frequency of the light source is the N Hz frequency when the first difference value is larger than the second difference value.

14. The method of claim 11 further comprising:
calculating a first flicker number observed on the display panel when the light source operates at the M Hz frequency; and
calculating a second flicker number observed on the display panel when the light source operates at the N Hz frequency.

15. The method of claim 14 further comprising:
calculating a first flicker band width observed on the display panel when the light source operates at the M Hz frequency based on the first flicker number and a panel resolution; and
calculating a second flicker band width observed on the display panel when the light source operates at the N Hz frequency based on the second flicker number and the panel resolution.

16. The method of claim 11 wherein M and N are equal to 60 and 50, respectively.

17. The method of claim 11 wherein M and N are equal to 50 and 60, respectively.

18. A display device capable of detecting flicker frequency comprising:
an image-capturing device for capturing image under an illumination of a light source including:
an image sensor; and
a shutter for controlling an exposure time of the image sensor;
a display panel for displaying images;
a sensing window including a plurality of adjacent sensing sections of a same size on a display panel;
a judging device for outputting signals based on light intensities detected by a first, an (m+1)th, and an (n+1)th sensing sections of the sensing window, wherein a ratio between an area covered by the first through mth sensing sections and an area covered by the first through nth sensing sections is proportional to a ratio between M and N; and
a control device coupled to the image-capturing device for controlling the shutter based on the signals outputted by the judging device.

19. The display device of claim 18 wherein the image sensor includes a complementary metal-oxide semiconductor (CMOS) sensor.

20. The display device of claim 18 wherein the shutter includes an electronic rolling shutter (ERS).

* * * * *